United States Patent [19]

Schuller

[11] 3,929,634

[45] Dec. 30, 1975

[54] REMOVAL OF MERCURY FROM AQUEOUS SOLUTIONS EMPLOYING NAVAL STORES PRODUCTS

[75] Inventor: Walter H. Schuller, Bowie, Md.

[73] Assignee: The United States of America as represented by the Secretary of Agriculture, Washington, D. C. 20250

[22] Filed: Aug. 16, 1974

[21] Appl. No.: 498,164

[52] U.S. Cl.: .................. 210/49; 75/108; 210/38 C; 210/51; 423/102
[51] Int. Cl.² .......................................... C02B 1/20
[58] Field of Search................ 75/101 BE, 108, 109; 210/21, 23, 38, 42, 51–54, 59, 49; 260/97.5, 97.6, 97.7; 423/101, 102

[56] References Cited
UNITED STATES PATENTS

| | | | |
|---|---|---|---|
| 828,938 | 8/1906 | Kniffler | 210/52 |
| 2,988,504 | 6/1961 | Mazurek | 210/53 |
| 3,719,654 | 3/1973 | Stone | 260/97.5 |

FOREIGN PATENTS OR APPLICATIONS

| | | | |
|---|---|---|---|
| 13,481 | 6/1905 | United Kingdom | 210/59 |

*Primary Examiner*—Charles N. Hart
*Assistant Examiner*—Peter A. Hruskoci
*Attorney, Agent, or Firm*—M. Howard Silverstein; Max D. Hensley

[57] ABSTRACT

Dilute solutions of mercury in aqueous solutions can be lowered drastically in mercury concentration by adding certain naval stores products such as tall oil soap, acidified tall oil soap, tall oil rosin, and others named herein, shaking the mixture, and filtering the solution.

9 Claims, No Drawings

REMOVAL OF MERCURY FROM AQUEOUS SOLUTIONS EMPLOYING NAVAL STORES PRODUCTS

Alarming concentrations of mercury are being dumped into many of the nation's streams and lakes. There are several means for removing large amounts of mercury from industrial effluents but removal below 100 parts of mercury per billion parts of water has proved very difficult and costly. The new treatments described herein are capable of reducing the mercury content down below the 5 parts per billion (ppb) now permitted in drinking water.

The new treatment involves contacting the aqueous solution of mercury salt (e.g., mercuric chloride, mercuric sulfate, mercuric acetate, mercuric nitrate, etc.) with about 0.2% by weight of a suitable naval stores product (such as tar, pitch, turpentine, pine oil, rosin, terpines, etc. obtained from one oleoresin of pine and other coniferous trees); agitating the mixture for a suitable length of time, and then filtering off the extremely insoluble mercury salts, which are formed. In some cases, emulsions are formed and a filter aid such as a diatomaceous silica is used to filter the solution, break the emulsion, and trap the mercury salt. While the term mercury salt is used herein, as a logical explanation for the removal of the mercury, some other occlusion phenomena may be operating to remove the mercury to such low levels. A satisfactory range of naval stores product that can be used is from 0.05 to 2% with a most convenient range about 0.1%–0.3% by weight based on the weight of the mercury salt solution. Periods of agitation may vary from one-half to 16 hours with a period of about one hour to three hours being most convenient. The Naval Stores Products which can be used advantageously in this process are, for example, and not by way of limitation; tall oil soap at its normal pH range of about 8 in the aqueous emulsion or adjusted to about pH 5; acidified tall oil soap; tall oil rosin (powdered); a highly oxidized rosin, and example of which is Hercules' "Vinsol" resin; a maleated "Vinsol" prepared by reacting 300 g of "Vinsol" with 100 g of maleic anhydride; FF ponderosa wood rosin, and others. In general, any naval stores product having one or more carboxyl groups will work, but some work better than others.

If the solutions of mercuric ions above 100 ppb are used, the naval stores products mentioned above will reduce the mercury content to a substantial degree. Further treatments with fresh portions of the naval stores products and removal by filtration, after agitation, will continue to reduce the level of mercury. The same thing is true when for example a mercuric chloride solution of about 119 ppb of mercury is treated with powdered tall oil rosin. The mercury level is substantially reduced (to about 13 ppb). Two subsequent treatments with fresh portions of powdered tall oil rosin at about 0.2% by weight, reduces the mercury content to 2.9 ppb.

The best product found was the cheapest naval stores products tested, namely, tall oil soap. This material, used at 0.2% by weight, reduced a mercuric chloride solution of 119 ppb to 0.77 ppb (less than one ppb) on 3 hours agitation.

The naval stores materials, after being used to remove mercury, can then be converted into copper resinates, which are used as fungicides. The small amount of mercury present will help improve the fungicidal action of the copper resinate. Alternatively, the naval stores product can be buried, or the mercury removed by washing with a solution of hydrochloric, sulfuric, or nitric acid, to give a concentrated solution of mercuric salt.

EXAMPLE 1

To 100 ml of a solution of mercury was added 0.60 g of a 50% aqueous solution and suspension of crude tall oil soap. The tall oil soap dissolved completely giving a brown solution of pH 8. This was shaken for 3 hours on an automatic shaker in case some of the material was of a colloidal nature. The 6N hydrochloric acid was added to a pH 2. The tan slimy solid was filtered by gravity through filter paper. The clear solution was found to have a mercury content of 0.77 ppb. All analyses were carried out by flameless atomic absorption techniques.

EXAMPLE 2

To 100 ml of a mercuric chloride solution containing 112 ppb of mercury was added 0.60 g of a 50% solids aqueous solution and suspension of crude tall oil soap. Hydrochloric acid (6N) was added until the pH was 5. At this point an emulsion formed. The emulsion was shaken for 3 hours on an automatic shaking device. Hydrochoric acid (6N) added to pH 3. The emulsion broke and a slimy solid came down which was filtered off by gravity through paper and then filtered through a small bed of diatomaceous silica (trade name "Celite"). The clear solution had a mercury content of 1.9 ppb.

EXAMPLE 3

To 100 ml of an aqueous solution of mercuric chloride containing 119 ppb of mercury was added 0.30 ml of acidified tall oil soap. (This soap was first heated and stirred to bring all the rosin into solution.) The emulsion was then shaken 3 hours and filtered through a 0.23 g bed of diatomaceous silica. The mercury content was found to be 2.0 ppb. A blank was run on the diatomaceous silica and it was shown to have a negligible effect on the removal of mercury from solution.

EXAMPLE 4

To 100 ml of an aqueous solution of mercuric chloride containing 119 ppb of mercury was added 0.20 g of tall oil rosin which was freshly ground to a fine powder with a mortar and pestle. The suspension was shaken for 3 hours and filtered by gravity through filter paper. The mercury content of the solution was 13.4 ppb. Another 0.29 g of freshly powdered tall oil rosin was added and the suspension shaken for 3 hours and filtered. Again, still a third 0.20 g of freshly ground tall oil rosin was added, the solution shaken for 3 hours and filtered by gravity. The mercury content of this last solution was 2.8 ppb.

EXAMPLE 5

To 100 ml of an aqueous solution of mercuric chloride of concentration 119 ppb of mercury is added 0.20 g of a finely powdered highly oxidized rosin fraction produced by Hercules under the trade name of Vinsol. The dispersion was shaken for 3 hours and filtered by gravity. The mercury content was 7.8 ppb.

EXAMPLE 6

Vinsol was maleated by heating 300 g of Vinsol with 100 g of maleic anhydride for 1 hour at 200°C. The product was stirred with benzene vigorously and the benzene decanted off from the insoluble product. The residual insoluble maleated vinsol was then dried in a vacuum oven at 135°C for 1 hr. to give a brown friable solid.

To an aqueous solution of mercuric chloride containing 119 ppb of mercury was added 0.20 g of the above maleated Vinsol, finely powdered. The dispersion was shaken for 3 hours and filtered by gravity. The resulting solution contained 9.5 ppb of mercury.

EXAMPLE 7

To an aqueous solution of mercuric chloride containing 119 ppb of mercury was added 0.20 of FF ponderosa wood rosin, in a finely powdered state. The dispersion was shaken for 3 hour and filtered by gravity. The mercury content of the resulting solution was 12.5 ppb.

EXAMPLE 8

A mixture of 300 g of tall oil rosin and 100 g of maleic anhydride was heated for one hour at 200°C. The maleated rosin was dissolved in benzene and washed with a saturated brine solution until neutral. The benzene was stripped and the pot residue dried at 135°C in a vacuum oven for 2 hours.

To 100 ml of a solution of mercuric chloride containing 1950 ppb of mercury was added 0.20 g of the above maleated tall oil rosin, powdered very finely. The dispersion was shaken for 3 hours and filtered. The mercury concentration was 152 ppb.

The experiment was repeated and shaking carried out for 16 hours. The dispersion, when filtered, exhibited 154 ppb of mercury present.

EXAMPLE 9

To a solution of 100 ml of an aqueous solution of mercuric acetate containing 42 ppb of mercury was added 0.30 ml of acidified tall oil soap. The emulsion was shaken for 3 hours and filtered through a small bed of a diatamaceious silic (trade name Celite). The clear solution had a mercury content of 2.7 ppb.

EXAMPLE 10

A mixture of 300 g of WW gum rosin and 100 g of maleic anhydride was heated to 200°C for one hour. The product was dissolved in benzene and extracted with a saturated aqueous salt solution until neutral. Stripped off benzene and dried the residual maleated gum rosin in vacuum oven at 130°C for 3½ hours.

To a 100 ml solution of mercuric nitrate containing 1979 ppb of mercury was added 0.20 g of the above maleated gum rosin as a finely divided powder. The dispersion was shaken for 16 hours and filtered by gravity. The filtrate contained 106 ppb of mercury.

EXAMPLE 11

To 100 ml of an aqueous solution of mercuric acetate containing 1971 ppb of mercury was added 0.20 g of the powdered maleated gum rosin prepared in Example 10. The dispersion was shaken 16 hours and filtered. The mercury content was 90 ppb.

EXAMPLE 12

To 100 ml of an aqueous solution of mercuric chloride of mercury content 1950 ppb is added 0.20 g of powdered maleated Vinsol, prepared as described in Example 6. The dispersion was shaken for 16 hours and filtered. The mercury content of the filtrate was 78.9 ppb.

EXAMPLE 13

To 100 ml of an aqueous solution of mercuric chloride of 1950 ppb of mercury was added 0.20 g of powderd maleated gum rosin as prepared in Example 10. The dispersion was shaken for one hour, filtered, and the mercury content of the filtrate determined to be 262 ppb.

The above experiment was repeated but the dispersion of 100 ml of mercuric chloride (1950 ppb mercury) and 0.20 g of maleated gum rosin was shaken for 3 hours and filtered. The mercury content of the filtrate was 230 ppb.

EXAMPLE 14

To an aqueous solution of mercuric chloride containing 1600 ppb of mercury was added 0.20 g of freshly powdered tall oil rosin and the dispersion shaken 16 hours. The dispersion was filtered and the filtrate contained 57 ppb of mercury.

I claim:
1. A Process for removing mercury salts from an aqueous solution of said salts, said process comprising:
   a. contacting the aqueous solution of mercury salt with about 0.05 to 2.0 weight percent, based on the weight of the solution, of a naval stores product having at least one carboxyl group;
   b. agitating the mixture from (a) for about one-half hour to about 16 hours; and
   c. filtering the solution from (b).
2. The process of claim 1 wherein the naval stores product is tall oil soap.
3. The process of claim 1 wherein the naval stores product is acidified tall oil soap.
4. The process of claim 1 wherein the naval stores product is tall oil rosin.
5. The process of claim 1 wherein the naval stores product is oxidized rosin.
6. The process of claim 1 wherein the naval stores product is maleated oxidized rosin.
7. The process of claim 1 wherein the naval stores product is ponderosa wood rosin.
8. The process of claim 1 wherein the naval stores product is maleated tall oil rosin.
9. The process of claim 1 wherein the naval stores product is maleated gum rosin.

* * * * *